United States Patent [19]
Montague

[11] Patent Number: 5,135,246
[45] Date of Patent: * Aug. 4, 1992

[54] FOLDABLE TANDEM BICYCLE

[76] Inventor: Harry Montague, 3042 Newark St., NW., Washington, D.C. 20008

[*] Notice: The portion of the term of this patent subsequent to Feb. 26, 2008 has been disclaimed.

[21] Appl. No.: 641,414

[22] Filed: Jan. 15, 1991

Related U.S. Application Data

[63] Continuation-in-part of Ser. No. 296,732, Nov. 3, 1989, Pat. No. 4,995,626.

[51] Int. Cl.⁵ .............................................. B62K 3/12
[52] U.S. Cl. .................................... 280/231; 280/278; 280/287
[58] Field of Search ............... 280/287, 278, 231, 7.11

[56] References Cited

U.S. PATENT DOCUMENTS

| | | | |
|---|---|---|---|
| 625,612 | 5/1899 | Sternberg | 280/7.16 |
| 4,448,437 | 5/1984 | Montague | 280/287 |
| 4,995,626 | 2/1991 | Montague | 280/231 |

FOREIGN PATENT DOCUMENTS

| | | | |
|---|---|---|---|
| 849384 | 11/1939 | France | 280/231 |
| 9321 | of 1896 | United Kingdom | 280/278 |
| 20525 | of 1896 | United Kingdom | 280/231 |
| 6908 | of 1897 | United Kingdom | 280/287 |
| 26352 | of 1899 | United Kingdom | 280/278 |

OTHER PUBLICATIONS

Burley Advertisement, Burley Design Coop. Inc.

Primary Examiner—David M. Mitchell
Attorney, Agent, or Firm—Sughrue, Mion, Zinn Macpeak & Seas

[57] ABSTRACT

A foldable tandem bicycle employs three separate frames joined at concentric seat tubes. The frames have quick release clamps to lock the frames into an open rigid orientation. The center frame has several configurations, unisex one having a closed complete frame with one diagonal brace and a second one with a pair of diagonal braces to eliminate the need for a top tube. A third embodiment employs in-line intermediate members.

20 Claims, 4 Drawing Sheets

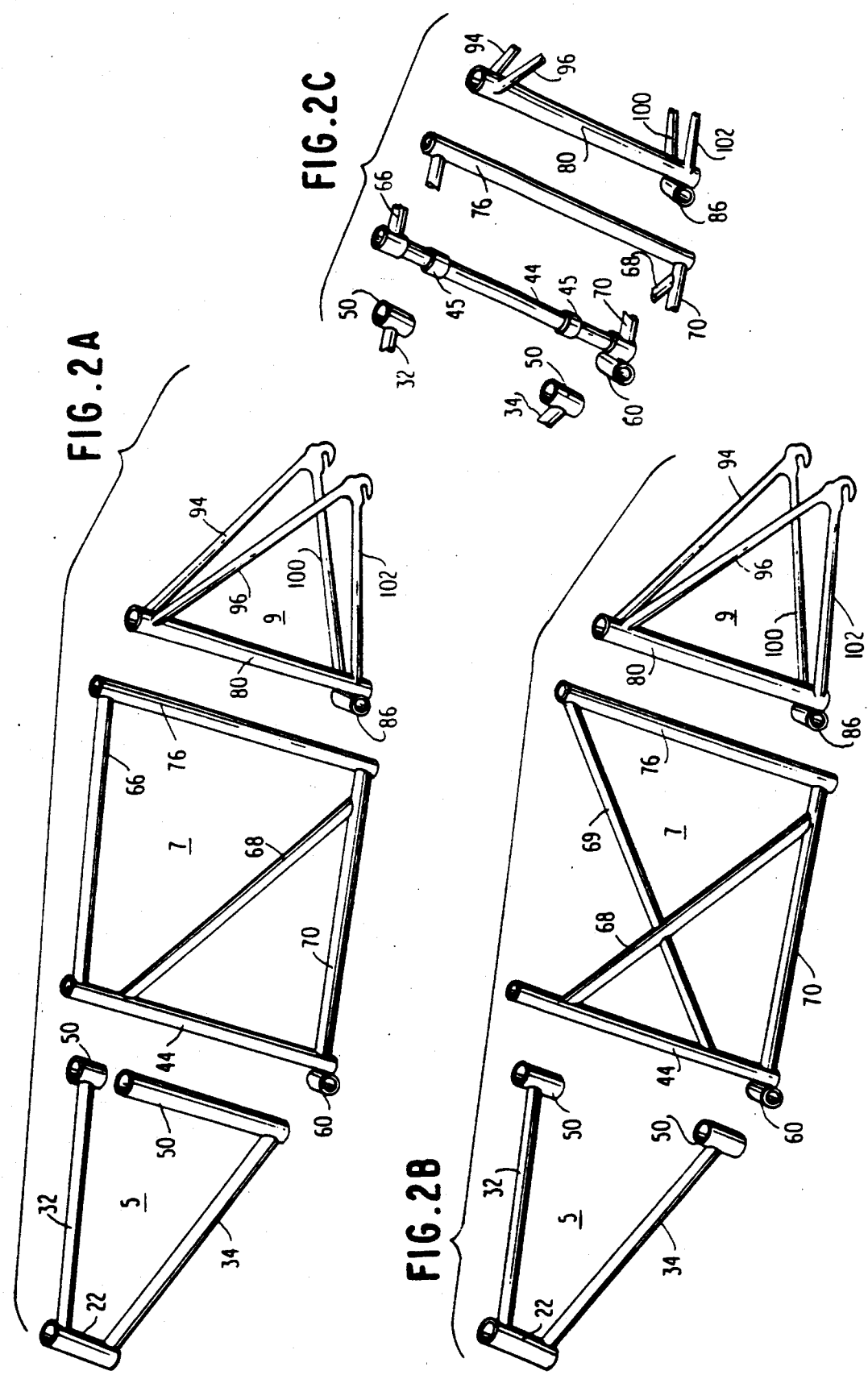

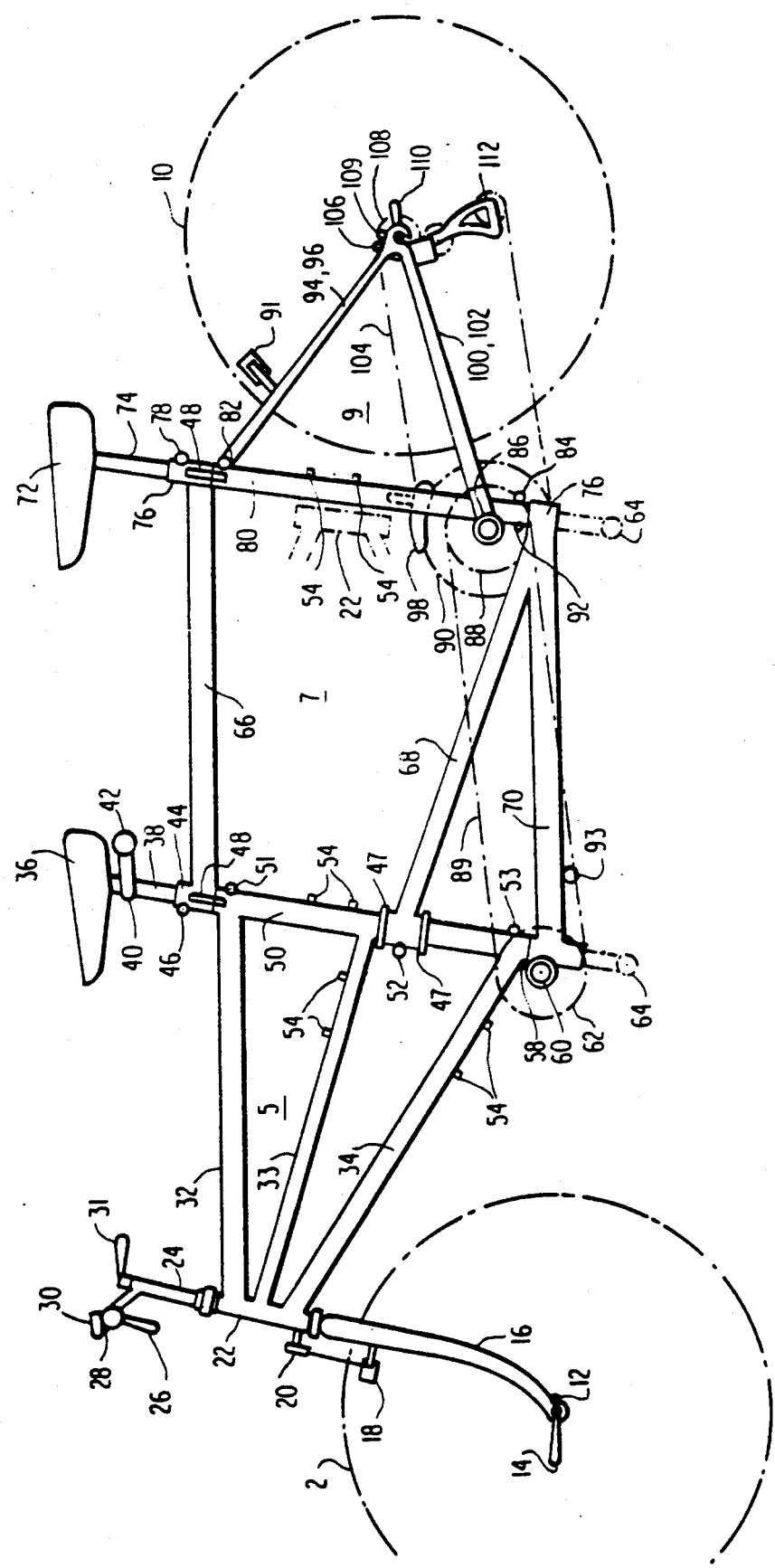

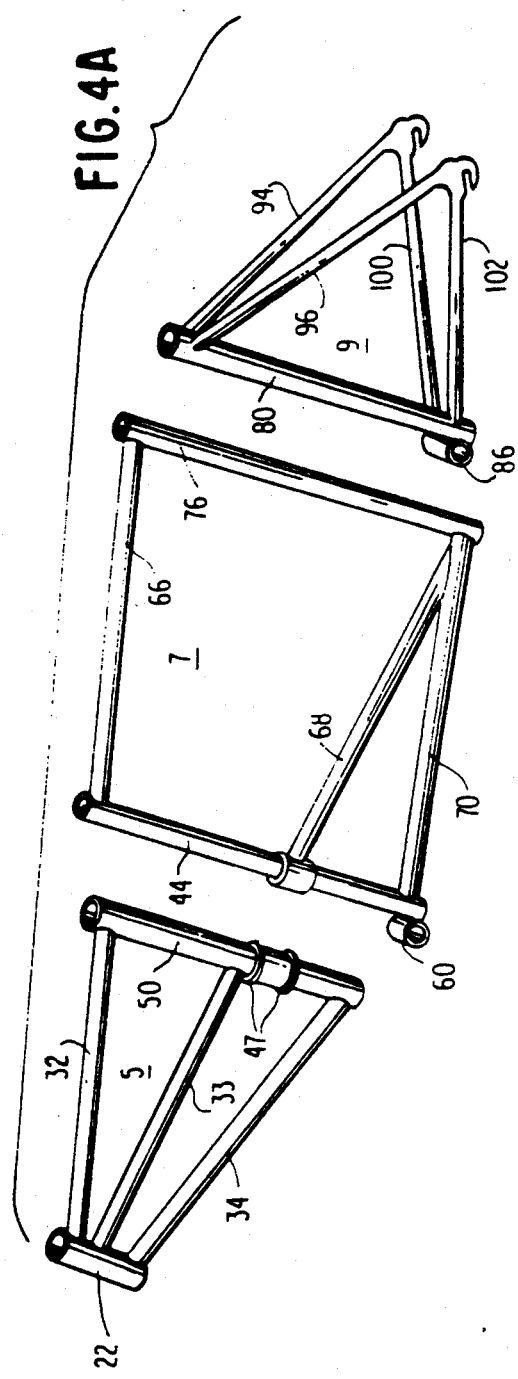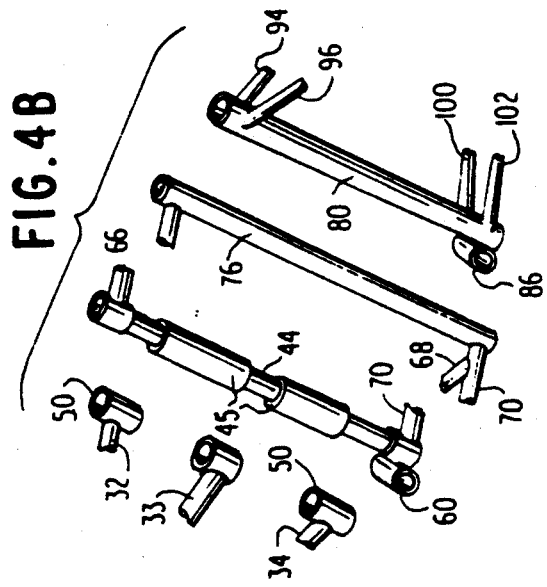

FOLDABLE TANDEM BICYCLE

FIELD OF THE INVENTION

This application is a continuation-in-part of application Ser. No. 07/296,732 filed on Nov. 3, 1989, now U.S. Pat. No. 4,995,626.

This invention relates to a collapsible tandem bicycle. In particular, this invention relates to a tandem having separate rigid front, center, and rear frame members joined together by concentric members forming two seat tubes with the frames foldable thereabout.

PRIOR ART

Foldable tandem bicycle technology is virtually non-existent. As can be appreciated, given the size of the tandem bicycle, the desire to provide a more compact device when stored or being transported is even greater than in the case of a normal bicycle. Two prior art concepts are the take apart, U.S. Pat. No. 579,982 and a collapsible bike, U.S. Pat. No. 3,688,879. Jakobson's U.S. Pat. No. 579,982 was simply unbolted and fell apart. The latest, U.S. Pat. No. 3,688,879 is a collapsible bicycle which can be made into various tandems. Other tandem concepts are shown in U.K. 6908, foldable about the front steering section, U.K. 9321, single frame with an insert to make a tandem and U.S. Pat. No. 625,612 a convertible tandem.

Few however, have attempted to provide a workable tandem that folds into a compact form since the means to date has not been available. With the establishment of the concentric seat tube hinging concept in U.S. Pat. No. 4,448,437, the practical foldable full sized bicycle technology became available. Prior to this patent others had attempted various folding concepts without success. This concentric seat tube technology established that frames could be made absolutely rigid about the horizontal plane through a hinged joint, if that hinged joint remained at the seat tube. The principle has worked for one hinged joint and bicycles using this technology have achieved commercial success. With that knowledge now public, to date its application has not been attempted for a "bicycle built for two".

A variation on U.S. Pat. No. 4,448,437 is a hinge joint just outside the seat tube such as in U.S. Pat. No. 3,015,498. This principle could be used to make up a "Z" fold as a technique of folding. The result however, would still never be structurally as strong and simple as using the concentric seat tube hinges.

SUMMARY OF THE INVENTION

Given the virtual non-existent prior art, it is an object of this invention to define a foldable tandem bicycle that is lightweight, has the necessary strength characteristics, and provides riding performance commensurate with contemporary fixed frame tandem designs.

Yet another object of this invention is to define a folding tandem bicycle which may be reduced in size to allow for easy transportation by carrying or rolling alone on a set of wheels for support.

Still further objects of this invention are to define a folding tandem design meeting contemporary safety requirements, that can be marketed economically and served utilizing standard components.

These and other objects of this invention are achieved in a folding tandem bicycle design utilizing rigid frame elements that fold around the seat tubes formed from concentric elements and not at some outside structurally unrelated points to the tandem design. In accordance with the present invention, both the stress of the beam action and the stress of any hinges are resolved within the seat tube itself.

The tandem frame in accordance with the present invention is made up of three interlocking frames, front one formed by the head tube, front top tube, down and seat tubes. The middle frame is formed by the front seat tube, middle top and bottom tubes with a diagonal intermediate brace, and the back seat tube. The back frame is formed of seat and chain stays and the back seat tube. Each of the frame elements is complete except the front frame which is interrupted along the front tube for the introduction of the middle frame diagonal brace. This diagonal brace collar is housed between the securable upper and lower elements of the front frame seat tube. When secured the front frame elements are complete being structurally integral. The seat construction in the back can be made up of two full-length tube and one partial-length tube collared to the full-length tube. A seat post can be sized to slide into the other two tubes.

The present invention defines three preferred embodiments. In the first preferred embodiment, both riding positions, front and back, would be termed non-unisex, with horizontal top tubes. In the second embodiment, the front position would be non-unisex, the back position would be unisex with the lower sloping top tubes. Both embodiments exist presently in non-folding tandems, the first being by the far the most used and strongest construction, the second trading construction strength for ease of mounting and dismounting by the stroker (back rider). In the second embodiment the center frame uses two diagonals forming X-bracing to stiffen its construction. This helps bridge the weight between the two wheel supports. A single back-sloping tube or dual back-sloping tubes would not be strong enough and/or hit the rear tire stopping the folding action. In the third preferred embodiment, a unisex version, the diagonal braces are substantially in-line to provide increased stiffness in the open frame.

In accordance with the present invention, the folding process is achieved expeditiously without the requirements of having to utilize a large number of tools or to materially disassemble the tandem. Rather such traditional steps of removal of the front wheel, seat post, the front one carrying the strokers handlebar, all with the throwing of standard quick releases. The folding process is continued with the rear set post safety catch being then depressed, the three binding quick releases are undone and the rear frame section is folded around over the middle section. Similarly, the front section safety catch and quick releases are undone and it too is folded around over the middle section but on the opposite side. In a folded position, the approximate size of the tandem is determined by the wheel size in the height direction and by the wheel size plus the chain wheel projection in the length direction.

What started out as an unwieldily, unstorable object over 8 feet long has been reduced to a 3 feet by 3 feet compact package. In such a folded position, the tandem bicycle can easily fit into the trunk space of a small car, conforms to airplane travel requirements, may be carried aboard elevators or rolled along on wheels as a suitcase on wheels.

Further, in accordance with the present invention, standard derailleur mechanisms, standard brakes including dual rear tandem brakes, standard tandem drive mechanisms including eccentric crank chain tighteners can all be used Other than the addition of concentric seat tubes with their accompanying quick releases and safety catches, the components follow the norm of all standard tandems.

BRIEF DESCRIPTION OF THE DRAWING

FIGS. 2A and 2B are exploded views of the two types of the frames of the first embodiment of this invention;

FIG. 2C is a view seat tubes of the first embodiment of this invention,

FIG. 3 is a side view of a second embodiment of a tandem bicycle in accordance with this invention; and FIGS. 4A and 4B are exploded views portions of the frame of FIG. 3.

DESCRIPTION OF THE PREFERRED EMBODIMENT

Figure 1:
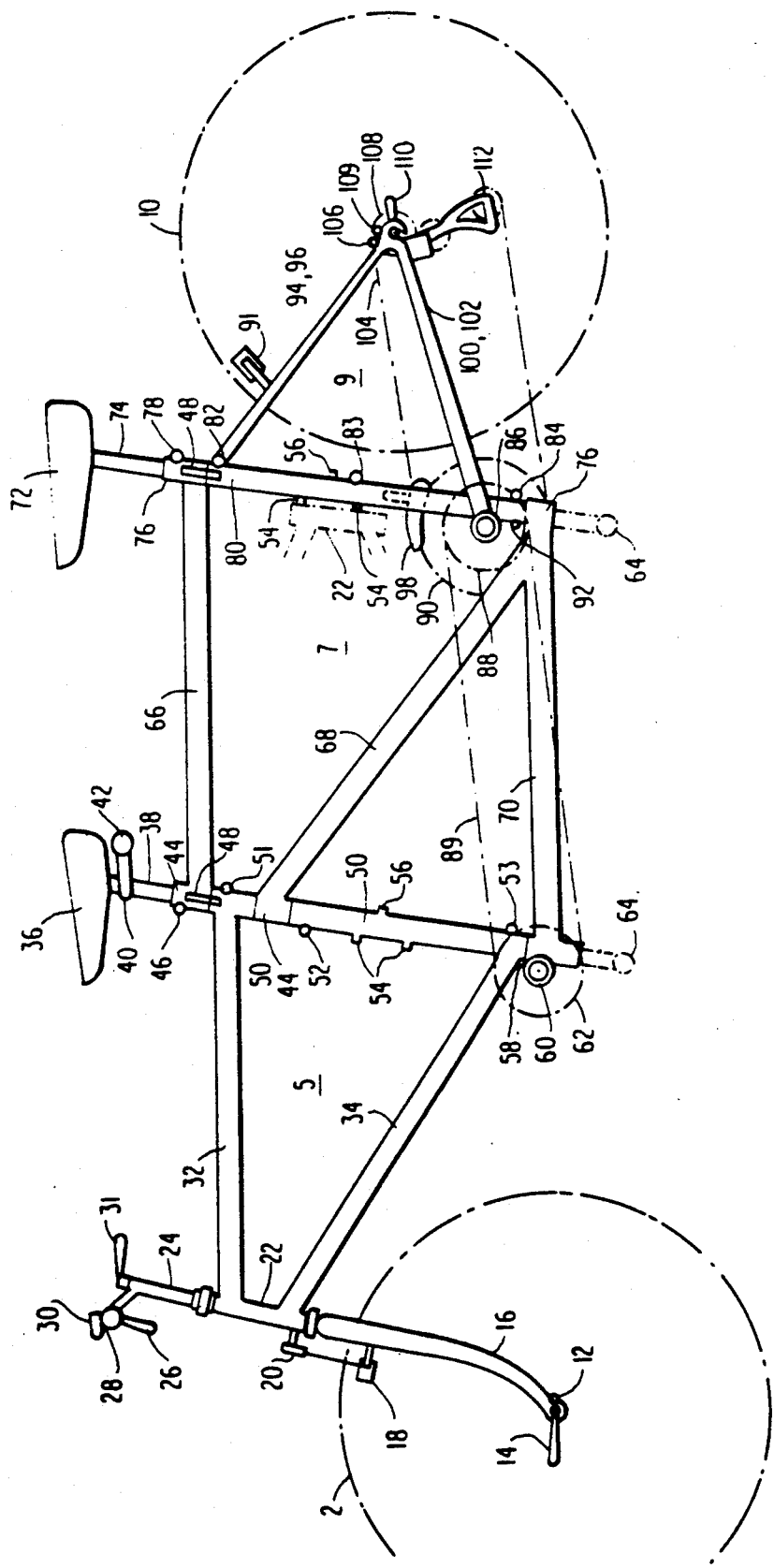
FIG. 1 is a side view of a tandem bicycle in accordance with a first embodiment of this invention.

Referring now to FIGS. and 2A, the first preferred embodiment of this invention is shown. FIGS. 2A, 2B show the fundamental alternative rigid frame configuration used in accordance with the present invention. The important characteristic of all the embodiments is the concentric nature of the seat tubes used to interlock the three frame members. In FIGS. 1, 2A, 2C, the front frame members 5 comprise a head tube 22, a top tube 32, a down tube 34, and seat tube component 50. These elements are constructed utilizing conventional bicycle technology by welding tubular elements to form a rigid construction. In FIGS. 2B and 2C components 50 and 44 are collared into complete continuous components. The collar elements 45 are stops for the frame elements locking their vertical position on the continuous frame. The middle assembly 7 comprises seat tube 44 and 76 front and back, bottom tube 70, diagonal tube 68, pedal housing 60, and a top tube 66 in FIGS. 2A and 2B or a X-bracket members 68 and 69 in FIG. 2C. The rear assembly number 9 comprises a pair of seat stays 94, 96, a pair of chain stays 100, 102, a seat tube 80 with a pedal housing 86. In FIG. 2B the lower part of seat tube 80 could be cut and collared onto the continuous seat tube member 76 but the front derailleur has to be set on member 80 half way up, so there is nothing to be gained. Finally, the tandem bicycle is configured to have the front section folded in only one direction and the rear section only in the opposite direction from the straight position. Metal blocks 58 and 92 ensure this folding mode and they have alignment pins to adjust for the return to the exact alignment configuration.

FIG. 1 illustrates the complete tandem assembly which apart from the double frame members utilizes completely standard components. The embodiment of FIG. 1 is constructed in a manner consistent with the frame assembly shown in FIG. 2A. That is, the same front frame member 5 is shown comprising a head tube 22, a top tube 32, a down tube 34, and a seat tube 50. As in standard conventional and tandem bicycles the head tube 22 houses a concentric internal handle bar stem 24. The handle bars 28 have attached brake handles 26, derailleur controls 30.

It is understood, but not shown, that the brake and derailleur controls have cables disposed to the front and rear wheels, front and rear derailleurs. Shown, however, is the first part of the cable having the brake quick release lever 20 which opens the front brake 18 far enough so the front wheel 2 can be removed. The front brakes are located on the front fork 16. The front wheel quick release must be backed off to unsecure the safety pin 12, then the lever 14 releases before the front wheel can be removed. The front seat tube is made up of the two concentric tube members, the outside member 50, part of the front frame 5 and the inside member 44, part of the middle frame 7. The outside tube 50 is drawn tightly around the inside tube 44 by the three quick releases 51, 52, and 53 each working a section of the tubes length to make both tubes act as one. The front seat tube 44 is capped with the seat 36, on the seat post 38, attached to which is the conventional stroker's handlebar 42, handlebar stem 40. The seat post can be removed by undoing the quick release 46 below the latch 48. At the bottom is the front rider's chain wheel 62, and conventional elliptical pedal housing 60 used to tighten the intermediary chain 90. Element 58 is the frame alignment stop, and 64 the retractable coaster wheel to roll the tandem on when it is folded.

The middle frame 7, as shown in FIGS. 2 and 2B, can be constructed as in first embodiment with a top tube 66, diagonal bracing 68, bottom tube 70, and seat tubes 44 and 76 or it can be constructed with X-bracing members 68 and 69, bottom tube 70, seat tubes 44, 76 as in the second embodiment. Diagonal braces 68 and 69 must be oval tubing set vertically so that the rear tire does not hit them restricting the folding process.

The rear seat tube as in the case of the front is constructed of the inside member 76 and the outside member 80 drawn tightly around it by the three quick releases 82, 83, and 84. The rear pedal housing 86 is cut around and attached the seat tube 80. This housing holds the main chain ring 89 and on the opposite side the rear connecting chain ring 88. The pedal housing and the chain ring are set high enough above the bottom tube 70 and away from the diagonal tube 68 so that when the rear frame is folded this chain ring will clear both of these members. In between the two chain rings is the alignment stop 92, and below another retractable coaster wheel 64. The rear drive train mechanism of the tandem in accordance with this invention utilizes standard components found on non-folding tandems. That is the larger drive sprocket assembly 90 is controlled by front derailleur mechanism 98 which moves the chain 104 to different sprockets. The chain connects back to the rear set of sprockets 108 controlled by the rear derailleur 112. It is also noted that during the folding of the tandem, none of the gear mechanisms are in any way affected by that operation. The front chain 90 which is the front rider's drive mechanism becomes disengaged and must be removed during the folding operation.

The rear frame 9 which is made up of the conventional seat stays 94, 96 holding the rear brake 91, chain stays 100, 102 all connected to the seat tube 80. An optional drum brake 106 used on tandems can be installed. The rear wheel 10 can be removed with the standard quick release 110. Not shown on either crank housing are the pedals, or on the frame members the brake and derailleur cables.

Referring now to the phantom line portion of FIG. 1, the folding operation in accordance with the present invention will be discussed. The first step is to remove the two seats utilizing the quick releases 46 and 78. Next, the front wheel is removed by utilizing the quick release 14. The tandem is then set down to rest on the front forks 16 and the rider moves to the rear, positioning himself over the rear seat tube. Quick releases 82, 83, and 84 are undone, the back latch 48 is depressed, then the middle frame is lifted to take the weight off the rear tire. Then, the rear frame section is folded around until it is tight against the diagonal 68. It can be secured in the folded position by tightening any one of the quick releases 82, 83 or 84. The chain 89 is picked up and stored. The rider then positions himself over the front seat tube and lifts the front end of the tandem up while extending the front coaster wheel 64.

Quick releases 5!, 52 and 53 are undone, the front latch 48 is depressed, then the front frame is lifted to take the weight off the front forks, then the front section is folded around until the handle bars are tight against the rear tube 80. Again, one quick release 51, 52 or 53 can be tightened to secure it in the folded position. Then the rear coaster wheel 64 can be lowered to below the bottom of the folded front forks so the folded tandem can be rolled along. The handle bar stem can be equipped with a quick release 31 so that the handle bar and stem can be pulled out of the headset, clipped onto the top tube 66 to achieve a tighter folded package.

Referring now to FIGS. 3 and 4A, the third preferred embodiment of this invention is illustrated. To the extent that this embodiment uses the same components as FIG. 1 the same numerals are used. FIGS. 3, 4A show the fundamental alternative rigid frame configuration used in accordance with the third embodiment of the present invention. The important characteristic of all the embodiments is the concentric nature of the seat tubes used to interlock the three frame members. FIG. 4B is a modified construction similar to FIG. 2C.

In FIGS. 3, 4A, 4B, the front frame members 5 comprise a head tube 22, a top tube 32, intermediate tube 33, a down tube 34, and seat tube component 50. These elements are constructed utilizing conventional bicycle technology by welding tubular elements to form a rigid construction. In FIGS. 4A and 4B components 50 and 44 are collared into complete continuous components. The collar elements 45 are stops for the partial frame elements locking the vertical position on the continuous frame.

The middle assembly 7 comprises front seat tube 44 and back seat tube 76, bottom tube 70, diagonal tube 68, pedal housing 60, and a top tube 66 as in FIG. 2A and 2C or a X-bracket members 68 and 69 as in FIG. 2B. In FIGS. 3 and 4A component 56 is collared by elements 47 into a complete continuous component. The rear assembly number 9 comprises a pair of seat stays 94, 96, a pair of chain stays 100, 102, a seat tube 80 with a pedal housing 86.

FIG. 3 illustrates the complete tandem assembly which apart from the double frame members utilizes completely standard components. The embodiment of FIG. 3 is constructed in a manner consistent with the complete frame assembly shown in FIG. 4A. That is, the same front frame member 5 is shown comprising a head tube 22, a top tube 32, a intermediate tube 33, a down tube 34, and a seat tube 50. As in standard conventional and tandem bicycles the head tube 22 houses a concentric internal handle bar stem 24. The handle bars 28 have attached brake handles 26, derailleur controls 30.

The rear seat tube as in the case of the front is constructed of the inside member 76 and the outside member 80 draws tightly around it by the two quick releases 82, and 84. The rear pedal housing 86 is cut around and attached the seat tube 80. This housing holds the main chain ring 90 and on the same side the connecting timer chain ring 88. This rear synchronizing chain ring is connected to the front synchronizing chain ring 62 by chain 91. Chain 91 can be tightened by conventional elliptical pedal housing or a chain tightening wheel 93. The rear pedal housing and the chain ring can be set tight to the bottom tube 70 and the diagonal tube 68 because when the rear frame is folded both rear chain rings don't have to clear these members. On the opposite side of the two chain rings is the alignment stop 92, and below another retractable coaster wheel 64.

The rear frame 9 which is made up of the conventional seat stays 94, 96 holding the rear brake 92, chain stays 100, 102 all connected to the seat tube 80. This is the same as the first embodiment. An optional drum brake 106 used on tandems can be installed. The rear wheel 10 can be removed with the standard quick release 110. Not shown on either crank housing are the pedals, or on the frame members the brake and derailleur cables.

There are three changes in the third embodiment versus the first embodiment of FIG. 1. First, in conventional non-folding tandems a continuous diagonal sloping member running from the center of the head set, 22, clear back down to the rear pedal housing, 86, is almost always used. As a long beam this tube's most important function is to resist lateral sway over the length of the bike. It also limits the lateral movement of the front pedal housing, 60, which is a weak point in tandem designs. In the second preferred embodiment this continuous beam is created by two diagonal tubes, 33 and 68, secured at their intersection by inner-outer tube quick release locking device 52 shown in FIG. 3. These two diagonal tubes, 33 and 68, added to frame members 5 and 7 replace the single diagonal tube, 68, in the first embodiment.

Secondly, in front frame member 5, tube 50 is no longer put in two halves and is continuous so that member 5 is now an unbroken, stronger frame. This is made possible by the middle frame member 7 tube 68 having at its end a tube section 56 which is collared on the outside of tube 50. Before tube 50 had been cut so tube 68 could attach directly to the inside tube 44. In the new design both members 5 and 7 are complete frames which should also again reduce the lateral sway of the bicycle.

Thirdly, in lieu of the crossover synchronizing chain design, a single-side synchronizing chain position was used in the third embodiment. Single-side drive permits the use of standard, off the shelf, non-tandem cranksets and single-side designs place little or no extra stress on the cranks or bottom brackets, thus less cost and improved strength. Also by having the rear synchronizing chain ring on the side where it does not have to clear the bolton tube, 70, this tube can be raised tight onto the rear crank housing, 86, and frame locking to frame becomes much more rigid, again reducing lateral sway.

Finally, the tandem can be outfitted with conventional accessories, some of the embossments for such illustrated. Elements 54 are for water bottles, 109 for rear luggage carrier.

Further modifications can be made to this invention without departing from the essential scope thereof.

I claim:
1. A foldable tandem bicycle frame comprising:
   a complete front frame having an intermediate member inside said front frame,
   a rear frame, an integral center frame having an intermediate member inside said center frame, a first seat tube, said front frame and a center frame foldable with respect to each other said first seat tube, said intermediate member of said front frame being in substantial angular and fore and aft alignment with said intermediate member of said center frame when said tandem is in a riding configuration, a second seat tube, said center frame and said rear frame foldable with respect to each other about said second seat tube, whereby said front and rear frames fold about respective first and second seat tubes to fold said frame.

2. The foldable tandem bicycle frame of claim 1 wherein said front frame and said second frame have concentric members forming said seat tube.

3. The tandem foldable bicycle frame of claim 1 wherein said center frame is a complete closed frame.

4. The foldable tandem bicycle frame of claim 2 wherein said center frame further comprises a pedal housing.

5. The foldable tandem bicycle frame of claim 3 wherein said front frame comprises a pair of collared seat tube components separated on said first seat tube by said intermediate member in said center frame.

6. The foldable tandem bicycle frame of claim 2 further comprising a first pedal housing on a lower corner of said center frame and a second pedal housing on a lower corner of said rear frame.

7. The foldable tandem frame of claim 1 wherein said center frame comprises a first pedal housing at a lower corner thereof and said rear frame has a second pedal housing at a corner thereof.

8. The foldable tandem bicycle frame of claim 1 further comprising quick release means to lock said front and center frames in a rigid unfolded configuration.

9. The foldable tandem bicycle frame of claim 1 further comprising quick release means to lock said center frame and said rear frame in a rigid unfolded configuration.

10. The foldable tandem frame of claim 1 wherein said center frame intermediate member is a diagonal member.

11. A foldable tandem bicycle comprising:

a complete front frame having a head tube, a diagonal intermediate member inside said front frame, and means for mounting a front fork with a front wheel and handle bars, a complete center frame including a first seat tube and a second seat and diagonal intermediate member inside said center frame, said center frame and said front frame foldable with respect to each other about said first seat tube, a first seat mounted on said first seat tube, a rear frame having stays for mounting a rear wheel, said center frame and said rear frame foldable with respect to each other about said second seat tube, a second seat mounted on said second seat tube, and a second set of handle bars mounted on said first seat tube behind said first seat, whereby said front and rear frames fold about respective first and second seat tubes to fold said frame.

12. The foldable tandem bicycle frame of claim 11, wherein said front frame and said second frame have concentric members about said seat tube.

13. The tandem foldable bicycle frame of claim 11, wherein said center frame is a complete closed frame.

14. The foldable tandem bicycle frame of claim 12, wherein said center frame diagonal intermediate member is in angular alignment with said diagonal intermediate member of said front frame when said bicycle is in a riding condition.

15. The foldable tandem bicycle frame of claim 13, wherein said front frame comprises a pair of collared seat tube components separated on said first seat tube by said diagonal member on said center frame.

16. The foldable tandem bicycle frame of claim 12, further comprising a first pedal housing on a lower corner of said center frame and a second pedal housing on a lower corner of said rear frame.

17. The foldable tandem bicycle frame of claim 11, wherein said center frame diagonal intermediate member has one end terminating at one of said seat tubes and the other end extending to a bottom tube of said center frame.

18. The foldable tandem frame of claim 17, wherein said center frame comprises a first pedal housing at a lower corner thereof and said rear frame has a second pedal housing at a corner thereof.

19. The foldable tandem bicycle frame of claim 11, further comprising quick release means to lock said front and center frames in a rigid unfolded configuration.

20. The foldable tandem bicycle frame of claim 11, further comprising quick release means to lock said center frame and said rear frame in a rigid unfolded configuration.

* * * * *